(12) United States Patent
Cain et al.

(10) Patent No.: US 12,294,772 B2
(45) Date of Patent: May 6, 2025

(54) SYSTEM AND METHOD FOR GENERATING A SYNOPSIS VIDEO OF A REQUESTED DURATION

(71) Applicant: Grass Valley Limited, Newbury (GB)

(72) Inventors: James Westland Cain, Newbury (GB); Drew Martin, Newbury (GB)

(73) Assignee: GRASS VALLEY LIMITED, Newbury (GB)

( * ) Notice: Subject to any disclaimer, the term of this patent is extended or adjusted under 35 U.S.C. 154(b) by 86 days.

(21) Appl. No.: 18/446,231

(22) Filed: Aug. 8, 2023

(65) Prior Publication Data

US 2024/0048821 A1 Feb. 8, 2024

Related U.S. Application Data

(60) Provisional application No. 63/396,066, filed on Aug. 8, 2022.

(51) Int. Cl.
*H04N 21/8549* (2011.01)
*H04N 21/234* (2011.01)
*H04N 21/488* (2011.01)

(52) U.S. Cl.
CPC ... *H04N 21/8549* (2013.01); *H04N 21/23424* (2013.01); *H04N 21/4884* (2013.01)

(58) Field of Classification Search
USPC ........................................ 386/241, 248, 278
See application file for complete search history.

(56) References Cited

U.S. PATENT DOCUMENTS

| 8,751,231 B1* | 6/2014 | Larsen .................... G10L 25/54 704/250 |
| 8,818,803 B2* | 8/2014 | Weber ................ G06F 16/7844 386/231 |
| 8,856,000 B1* | 10/2014 | Larsen .................. G06F 40/253 704/255 |
| 10,430,664 B2 | 10/2019 | Sanil et al. |
| 2014/0304505 A1* | 10/2014 | Dawson .............. G06F 21/6227 713/165 |
| 2020/0196028 A1 | 6/2020 | Kuehne, Jr. et al. |
| 2022/0215052 A1 | 7/2022 | Chalana et al. |

OTHER PUBLICATIONS

International Search Report and Written Opinion received for PCT Patent Application No. PCT/GB2023/052096, mailed on Oct. 25, 2023, 8 pages.

* cited by examiner

*Primary Examiner* — Nigar Chowdhury
(74) *Attorney, Agent, or Firm* — ARENTFOX SCHIFF LLP

(57) ABSTRACT

Disclosed herein are systems and methods for generating a synopsis video. A system may receive an input video of a first duration and a request to generate a synopsis video of a second duration based on the input video. The system generates a timed text transcription of the input video and divides the timed text transcription into a plurality of sentences. The system then ranks each of the plurality of sentences based on a similarity matrix and selects a subset of the plurality of sentences that includes highest ranked sentences of the plurality of sentences, with the subset having a summed time duration that is less than or equal to the second duration. The system extracts and combines respective clips from the input video that correspond to the selected subset of sentences to generate the synopsis video.

20 Claims, 5 Drawing Sheets

SYSTEM AND METHOD FOR GENERATING A SYNOPSIS VIDEO OF A REQUESTED DURATION

CROSS-REFERENCE TO RELATED APPLICATIONS

This application claims the benefit of U.S. Provisional Application No. 63/396,066, filed Aug. 8, 2022, which is herein incorporated by reference.

TECHNICAL FIELD

The present disclosure generally relates to media technology, and, more particularly, to a system and method for generating a synopsis video of a requested duration.

BACKGROUND

Visual media is consumed at a greater rate than ever before. This is largely due to the ease of access to video and significant improvements in media technology. Despite the fact that the amount of media to consume has increased, there remains only a finite window within which a viewer can possibly consume it. For example, an online video may feature an interview that is one hour long. However, a viewer may only have five minutes to view a video. In some cases, the viewer may avoid watching the online video and may choose a different video instead. In other cases, the viewer may manually skip through parts of the online video. Both approaches offer no benefits to the video producer or the viewer—the video producer either loses a view or the viewer ends up potentially skipping over important parts of the online video.

There thus exists a need for an approach in which a video is adjusted to meet the timely needs of a viewer without omitting key contents in the video. There is also a need for a system and method that enables a video producer to generate such adjusted videos.

SUMMARY OF THE INVENTION

The Agile Media Processing Platform (AMPP) is an example of a cloud-based platform that offers a comprehensive suite of applications. The present disclosure describes one application that is directed to generating synopsis videos. A synopsis video has a length that is suitable for the viewing requirements of a viewer and has contents that cover the key parts of its corresponding original video content (or essence).

In some aspects, the techniques described herein relate to a system for generating a synopsis video. The system comprises a user interface configured to receive an input video of a first duration. The system comprises a transcription generator configured to generate a timed text transcription of the input video that includes parsed speech that is mapped to different time instances in the input video. In an exemplary aspect, the user interface is further configured to receive a request to generate, based on the input video, a synopsis video with a duration no greater than a second duration that is less than the first duration. The system comprises a sentence identifier configured to divide the timed text transcription into a plurality of sentences, wherein each sentence has a set time duration. The system further comprises a ranking module configured to determine a summary of the input video. Specifically, the ranking module generates a similarity matrix that compares each of the plurality of sentences, ranks each of the plurality of sentences based on the similarity matrix, and selects, as part of the summary, a subset of the plurality of sentences that includes highest ranked sentences of the plurality of sentences, with the subset having a summed time duration that is less than or equal to the second duration. The system further comprises a video editor configured to extract, from the input video, respective clips that correspond to the selected subset of sentences in the summary, and further configured to generate, based on the summary, the synopsis video by combining the extracted clips.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

DETAILED DESCRIPTION

Figure 1:
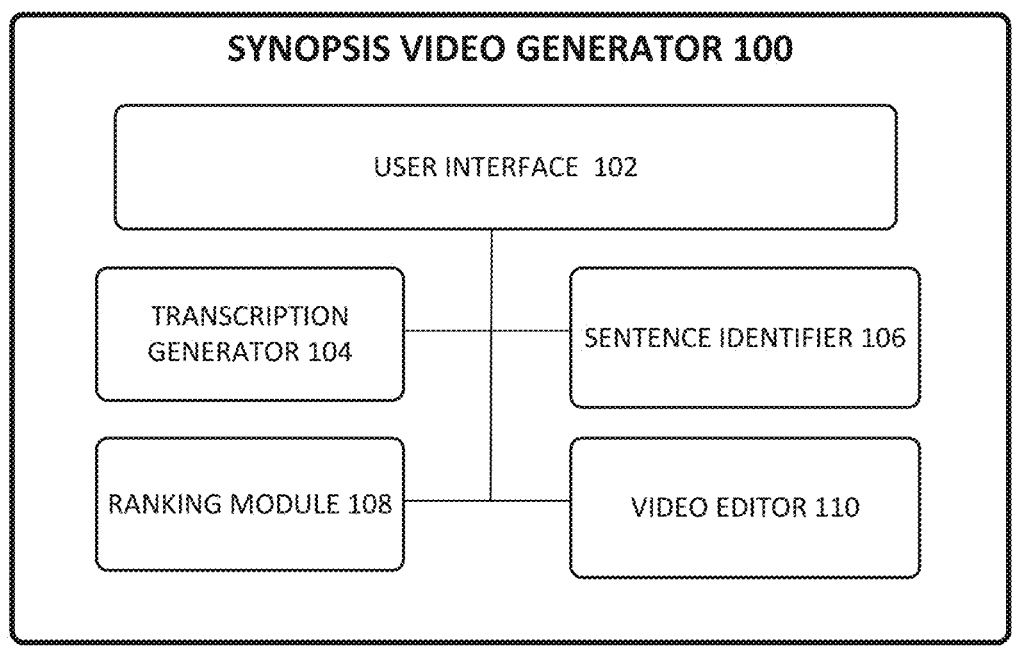
FIG. 1 is a block diagram of components in a synopsis video generator according to an example embodiment.

Various aspects of the disclosure are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the disclosure in order to provide a basic understanding thereof.

FIG. 1 is a block diagram of components in synopsis video generator 100 according to an example embodiment. In general, synopsis video generator 100 can be implemented as a component of a video production environment, video editor or the like. According to an exemplary aspect, synopsis video generator 100 is configured to identify the most important portions of an input video (e.g., the highest prioritized in terms of content of interest) that can fit into a synopsis video of a desired duration. User interface 102 is configured to receive the input video (e.g., original video content captures from one or more cameras at a live event or content provided from a video server) and user commands such as the request to generate a synopsis video of a specific duration. Transcription generator 104 is configured to detect speech in the audio portion of the input video and convert the speech into text. Sentence identifier 106 divides the text into a plurality of sentences and ranking module 108 sorts the plurality of sentences by importance. Video editor 110 identifies the clips in the input video that correspond to a subset of sentences of the highest ranks, wherein the summed duration of the identified clips is less than or equal to the desired duration. Video editor 110 is configured to include as many sentences as possible in a single synopsis video without exceeding the desired duration. However, in some cases, the summed duration may be slightly higher than the desired duration if the extra duration is less than a threshold duration (e.g., by a few seconds). Video editor 110 then combines the identified clips into a single synopsis video.

Figure 2:
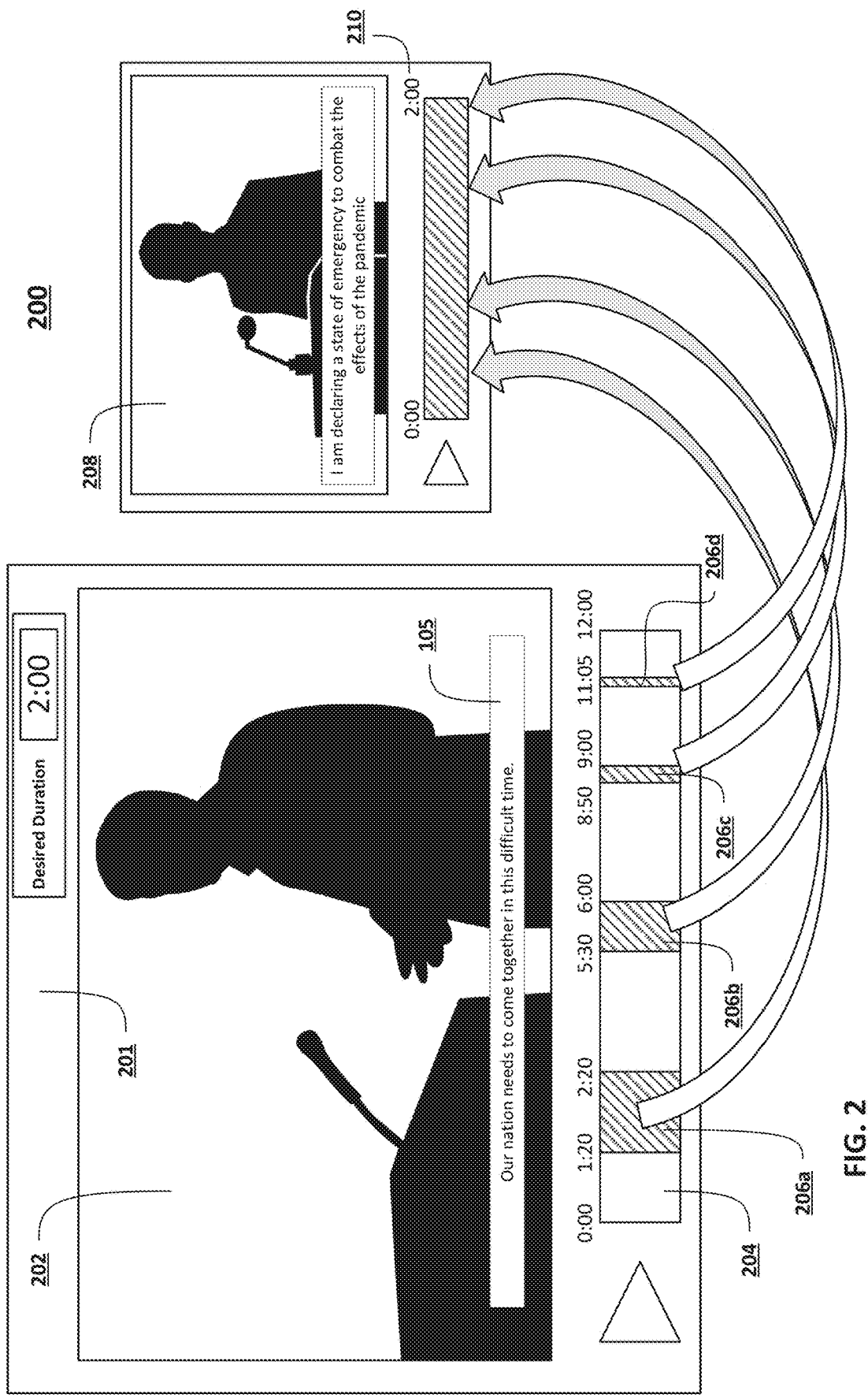
FIG. 2 is a diagram of a synopsis video being generated from an original video according to an example embodiment.

FIG. 2 is diagram 200 of a synopsis video being generated from an original video according to an example embodiment. In diagram 200, user interface 201 (used interchangeably with user interface 102) may be a graphical user interface that is a part of a video editing application. For example, the video editing application may be media production application 304 (described in FIG. 3). A component of the video editing application may be synopsis video generator 100, which is configured to generate synopsis videos.

Suppose that a user provides input video 202 (e.g., original media content or essence) to the media production application. For example, input video 202 may be an hour long speech given by a politician. The user, however, may only be interested in viewing/providing a brief version of input video 202. The user may interact with user interface 201 and provide a desired duration for the output video (i.e., the synopsis video). In diagram 200, the desired duration is 2 minutes.

The present disclosure describes an extraction-based approach to video summarization in which the most important parts of the input video are identified and combined to generate the synopsis video. Evaluating importance is performed by textual analysis algorithms. Accordingly, transcription generator 104 of synopsis video generator 100 may first generate a timed text transcription of input video 202. The timed text transcription may include parsed speech that is mapped to different time instances in input video 202. For example, input video 202 may include dialogue 105 that states "our nation needs to come together in this difficult time." Dialogue 105 may be delivered between the 1 minute 20 second mark and the 1 minute 25 second mark of input video 202. This makes the total duration of dialogue 105, 5 seconds. Likewise, input video 202 may include several other dialogues throughout its duration, and each dialogue may have its own time window and duration associated with it. Transcription generator 104 employs speech recognition algorithms to transcribe the audio in input video 202 and further adds the timing information described above as part of a timed text transcription.

In some aspects, the speech recognition algorithms executed by a transcription generator include grammatical identifiers that add punctuation to the converted text. For example, the speech recognition algorithms may categorize different words as articles, verbs, nouns, etc., and may further categorize the words as subjects and predicates. Using the rules of grammar, transcription generator 104 may insert punctuation marks in between a sequence of words to form complete sentences. The punctuation may include, but are not limited to, periods, exclamation points, question marks, apostrophes, quotation marks, and commas.

Sentence identifier 106 may then use grammar to divide the timed text transcription into a plurality of sentences. For example, a timed text transcription may be a giant block of text with punctuation marks. Sentence identifier 106 may search for certain punctuation marks that represent the end of a sentence. For example, sentence identifier 106 may identify the first sentence in the timed text transcription by identifying the first period, question mark, or exclamation point. Sentence identifier 106 may identify a second sentence as including words between the first period and a subsequent period, question mark, or exclamation point.

In some aspects, sentence identifier 106 may search for other cues that indicate the end of a sentence and the beginning of another sentence. For example, sentence identifier 106 may determine that a first set of words was spoken by a first person and that a second set of words following the first set of words was spoken by a different person based on different vocal attributes detected in the audio portion of input video 202 and/or different faces detected in the video frames of input video 202. Accordingly, sentence identifier 106 may classify the first set of words as at least one sentence and the second set of words as at least one different sentence.

In another example, sentence identifier 106 may search for audible pauses in the audio to detect when a first sentence ends and another begins. For example, sentence identifier 106 may determine that a pause, between two portions of the timed text transcription, that is greater than a threshold period of time (e.g., 1 second) represents a division point between two portions of text in the timed text transcription. In response to determining that the audible pause is greater than the threshold period of time, sentence identifier 106 may determine that a first portion of the two portions is at least one sentence and a second portion of the two portions is at least one different sentence.

Synopsis video generator 100 may then initiate a summarization process of the timed text transcription. As discussed before, each sentence has a set time duration. For example, the first sentence may have stated in input video 202 during a 5 second window. A second sentence may have been stated in input video 202 during a 3 second window. Because the user selected a desired duration of 2 minutes, the output should be a synopsis video that includes sentences with set time durations that sum up to at most 2 minutes. While this can be done by selecting random sentences such that the combination of sentences has a total duration of 2 minutes, the random sentences may not be a good representation of the speech as a whole. For example, the speech may be about recovery measures taken during a pandemic and a portion of the speech may discuss a charity event unrelated to the recovery measures. If the random sentences are largely taken from the discussion of the charity event, a viewer will miss out on the main topic of input video 202.

Ranking module 108 is thus configured to identify key sentences from the plurality of sentences in the timed text transcription. In an exemplary aspect, ranking module 108 generates a similarity matrix that compares each of the plurality of sentences against each other. An example structure of a similarity matrix is shown below:

TABLE 1

Similarity Matrix

|  | Sentence 1 | Sentence 2 | ... | Sentence N |
|---|---|---|---|---|
| Sentence 1 | — | 5 | ... | 12 |
| Sentence 2 | 5 | — | ... | 3 |
| ... | ... | ... | — | ... |
| Sentence N | 12 | 3 | ... | — |

The rows and columns of the similarity matrix represent sentences. The values inside the similarity matrix may represent a similarity value between two sentences. For example, sentence 1 and sentence 2 have a similarity value of 5. In some aspects, the similarity value may be an amount of words shared by the sentences.

In other aspects, the similarity value may be a cosine distance. For example, ranking module 108 may vectorize each sentence and determine a cosine similarity of two vectorized sentences. For example, each word of a sentence may be assigned a number or may be converted into a numerical hash value. Each sentence may then be represented by a plurality of numbers or numerical hash values representing the words in the sentence.

In some aspects, ranking module 108 may filter the sentences prior to determining the similarity values. For example, ranking module 108 may remove stop words in a predetermined dictionary from the timed text transcription. Such stop words may include words such as "the," "a," "of," etc., that are commonly present in ordinary sentences and may inadvertently cause higher than expected similarity values. In another example, ranking module 108 may utilize the categories of the words described previously, and remove all words that are not in a predetermined type of words. For example, ranking module 108 may only retain nouns, pronouns, and verbs in its similarity calculation.

In an exemplary aspect, ranking module 108 may rank each of the plurality of sentences based on the similarity matrix. For example, ranking module 108 may apply a pagerank algorithm on the similarity matrix, which may result in a matrix that includes a list of sentences in order of importance. The higher the sentence is listed in the matrix, the greater the likelihood of the sentence being included in the summary.

In another example that is simplified for the demonstration purposes, the similarity values in table 1 may be summed to produce the following matrix:

TABLE 2

Summed Matrix

|  | Summed Value |
|---|---|
| Sentence 1 | 32 |
| Sentence 2 | 21 |
| ... | ... |
| Sentence N | 70 |

Higher summed values indicate that the sentence have more in common with a central topic (more shared words) and are therefore more important than other sentences. It should be noted that any function that combines the values in the similarity matrix may be used in the place of a summation function according to an exemplary aspect. Furthermore, due to the symmetry of the matrix, the function may be applied by row or by column. Subsequent to the applying the function, the ranking module 108 may rank each sentence by the summed value. In this case, the ranked matrix may be:

TABLE 3

Ranked Matrix

|  | Summed Value |
|---|---|
| Sentence N | 70 |
| Sentence 1 | 32 |
| Sentence 2 | 21 |
| ... | ... |

Ranking module 108 may then select, as part of the summary, a subset of the plurality of sentences that includes highest ranked sentences of the plurality of sentences, with the subset having a summed time duration that is less than or equal to the desired duration. For example, the summed duration of the first 200 sentences in the ranked matrix may be 2 minutes. In some cases, the first 200 sentences may account for a time duration less than 2 minutes, but the inclusion of another sentence (i.e., the 201th sentence) may cause the synopsis video to have a duration greater than the desired duration. Accordingly, the 201th sentence is not included in the synopsis video, which ultimately has a duration less than the desired duration.

Video editor 110 may then extract, from input video 202, respective clips that correspond to the selected subset of sentences in the summary. For example, clips 206a, 206b, 206c, and 206d, may be different parts of input video 202 that include audio corresponding to the sentences in the subset of sentences. Video editor 110 may determine, using the time information in the timed text transcription, when a sentence is spoken in input video 202 and may extract that clip. It should be noted that because 200 sentences are in the subset, 200 clips are extracted from input video 202. However, only four fragments are shown in FIG. 2 for simplicity. Other clips such as clip 204 may not include any of the sentences in the subset, and are therefore not extracted.

In some aspects, video editor 110 re-sorts the sentences from their ranked positions to their timed positions. For example, sentence N is ranked higher than sentence 1. However, because sentence 1 appears sequentially before sentence N in input video 202, video editor 110 adjusts the order of the ranked sentences such that a clip associated with sentence 1 appears in the synopsis video before a clip associated with sentence N in an exemplary aspect. Of course in another exemplary aspect, the video editor 110 orders the sentences according to their ranked position for the synopsis video. The ordering of these videos may also be user selectable in an exemplary aspect. In any event, video editor 110 then generates, based on the summary, synopsis video 208 by combining the extracted clips 206a, 206b, 206c, and 206d. Synopsis video 208 has a duration 210 that is equal to or less than the desired duration.

It should be appreciated that while FIG. 2 illustrates selecting clips to generate the synopsis video 208 from a single media file, in alternative aspect, the system and method described herein can be configured to select clips from multiple media files, assuming the files are generally related to the same subject so that there will be similarities in the sentences from the different media files. Then, based on the total time selected for the synopsis video 208, the system and method can be configured to select the number of clips across the multiple media files to generate the synopsis video 208 using the techniques described above.

Figure 3:
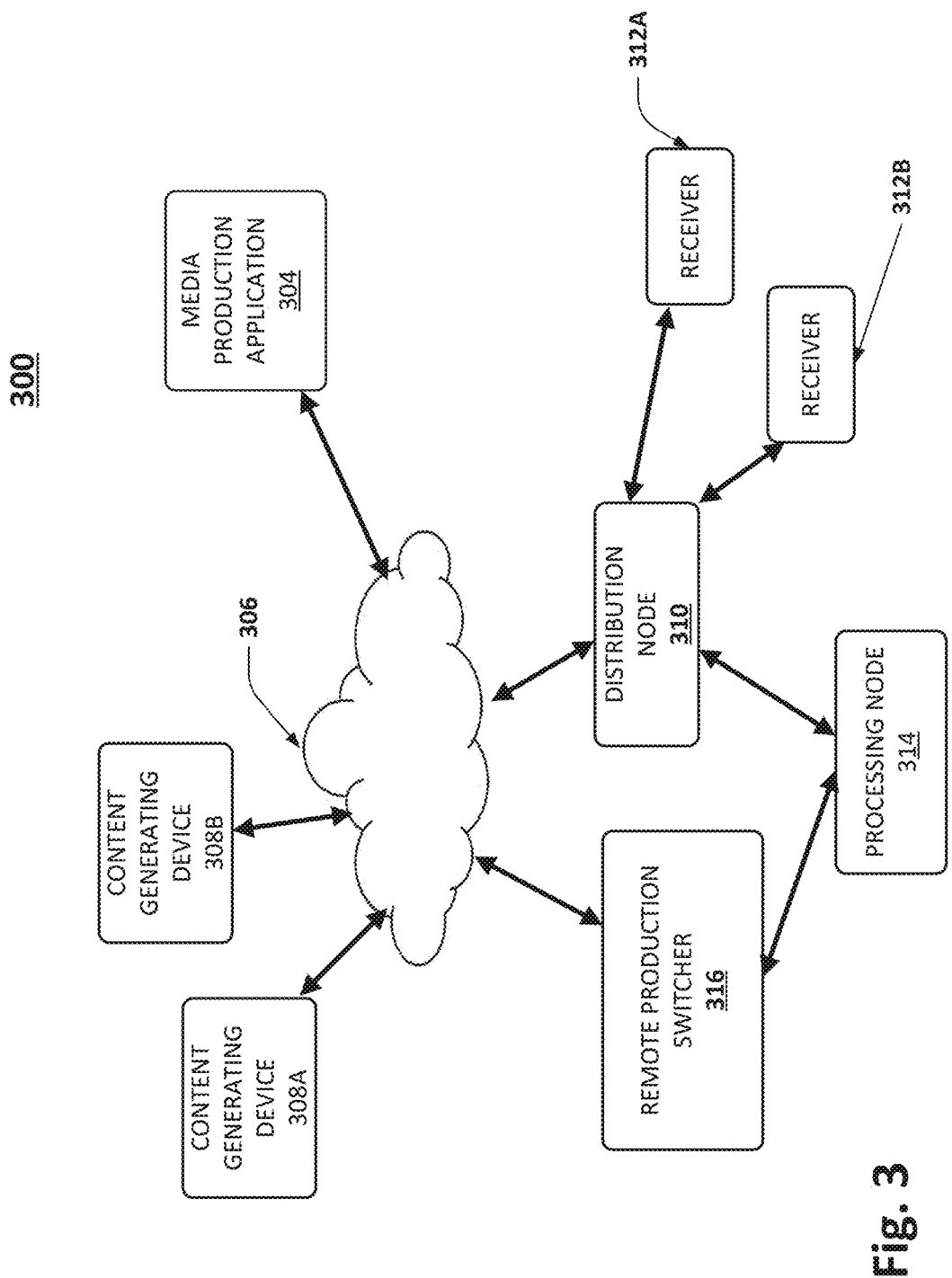
FIG. 3 is a diagram of a media production network according to an example embodiment.

FIG. 3 is a diagram of media production network 300 according to an example embodiment. In an exemplary aspect, media production application 304 includes synopsis video generator 100. Media production application 304 may feature synopsis video generator 100 as a standalone feature, or as a module in a plurality of media production modules. A media platform, such as AMPP, may be available on the cloud network 306 across multiple nodes (e.g., processing node 314, distribution node 310, etc.).

Content generating (or providing) devices 308A and 308B represent, for example, cameras that are used to provide streams of live events (e.g., sports events) or video servers configured to provide stored media essence. The content outputted from content generating devices 308A and 308B may include videos such as input video 202. In an alternative embodiment, the content generating devices 308A and 308B may be video or media servers or any other device configured to store and/or provide essence to be used in a media production.

Each command of application 304 may be executed using a particular node in a cloud network. That is, to provide these capabilities, the functionality of application 304 maps interface points of the particular functions to the controlling points of lower level platform services (i.e., as nodes) distributed across the network.

Moreover, the one or more distribution nodes 310 (e.g., electronic devices) are configured to distribute the production media content to one or more distributed nodes (e.g., remote media devices), such as receivers 312A and 312B, which can be content consuming devices (e.g., televisions, computing devices, or the like) or video editors for receiving the synopsis video 208 for further editing and production processing prior to distribution to content consuming devices (e.g., end users). For example, a synopsis video 208 may be provided to receivers 312A and 312B. Moreover, it should be appreciated that while only two receivers 312A and 312B are shown, the network can include any number of content consuming devices configured to receive and consume (e.g., playout) the media content, with such content consuming devices even being distributed across different countries or even different continents.

Moreover, in this network, distribution node(s) 310 can further be configured to distribute the media content (e.g., input video 202 and/or synopsis video 208) throughout the distribution network to one or more processing node(s) 314, which may include a mix/effects engine, keyer or the like. Examples of processing node(s) 314 may include remote production switches similar to remote production switcher 316 or remote signal processors and can be included in the cloud computing environment in an exemplary aspect.

Figure 4:
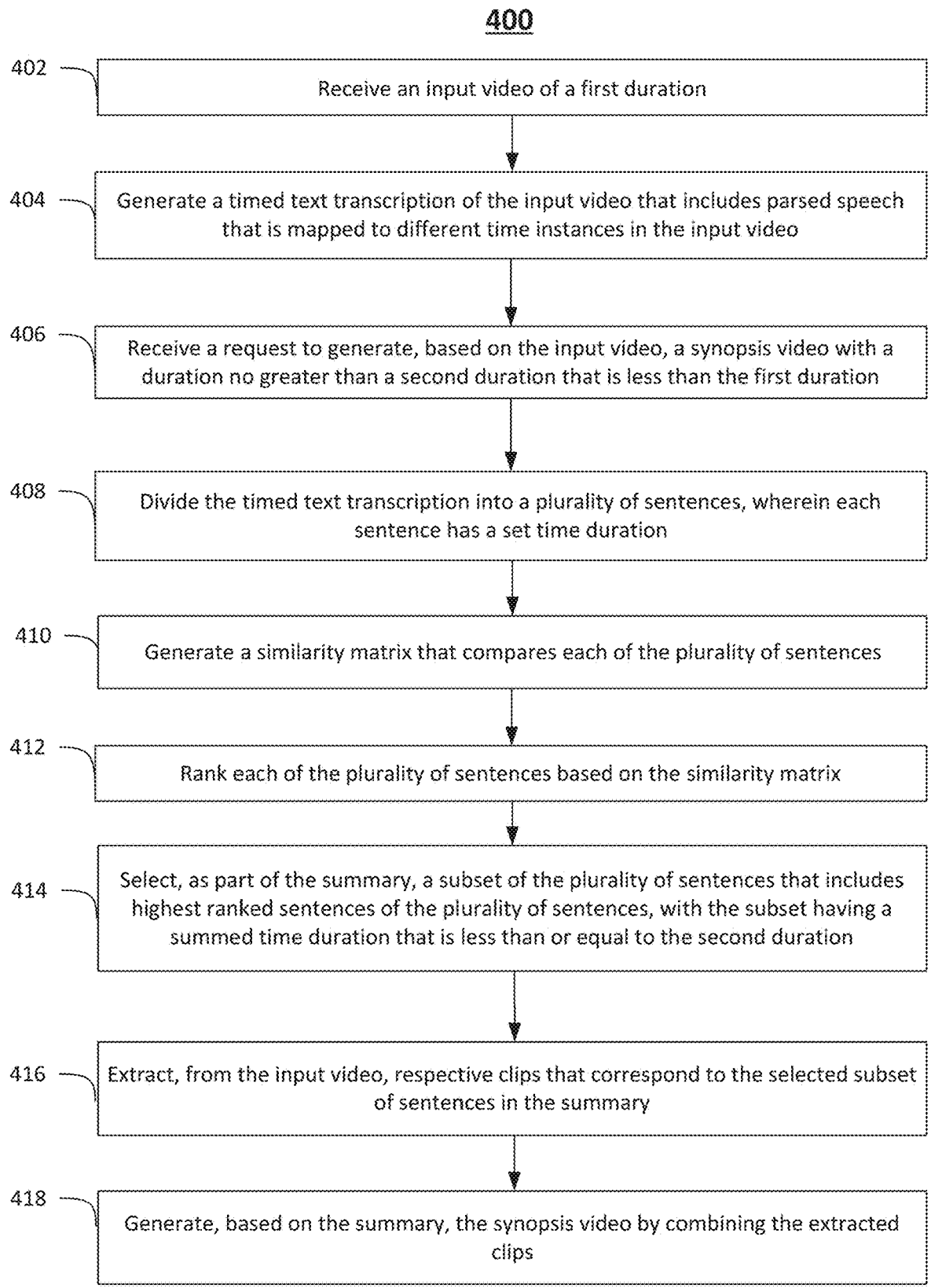
FIG. 4 is a flow diagram of a method for generating a synopsis video of a desired duration according to an example embodiment.

FIG. 4 is a flow diagram of method 400 for generating a synopsis video of a desired duration according to an example embodiment. At 402, user interface 102 receives an input video of a first duration, which may be the complete time duration of the video file (e.g., one hour). At 404, transcription generator 104 generates a timed text transcription of the input video that includes parsed speech that is mapped to different time instances in the input video.

At 406, user interface 102 receives a request to generate, based on the input video, a synopsis video (e.g., synopsis video 208) with a duration no greater than a second duration that is less than the first duration. That is, the user can specify a shortened time (e.g., two minutes) for the synopsis video to include the key clips that are of interest to that user.

At 408, sentence identifier 106 divides the timed text transcription into a plurality of sentences, wherein each sentence has a set time duration based on the respective length of the sentence.

From 410 to 414, ranking module 108 determines a summary of the input video. More specifically, at 410, ranking module 108 generates a similarity matrix that compares each of the plurality of sentences. At 412, ranking module 108 ranks each of the plurality of sentences based on the similarity matrix. At 414, ranking module 108 selects, as part of the summary, a subset of the plurality of sentences that includes highest ranked sentences of the plurality of sentences, with the subset having a summed time duration that is less than or equal to the second duration. In other words, the total summed time of the selected sentences should be equal to or less than the time the user set for the synopsis video.

At 416, video editor 110 extracts, from the input video, respective clips that correspond to the selected subset of sentences in the summary. At 418, video editor 110 generates, based on the summary, the synopsis video by combining the extracted clips. In one exemplary aspect, the video editor 110 is configured to generate a new video file for the synopsis video that can be distributed to a video editor application, as described above, for further editing and video processing before distribution for consumption. In addition, the new video file can be configured to include metadata of each clip included in the synopsis file. This metadata information may include timing that the content was original captured, copyright information, and other relevant information necessary for media production, as known to those skilled in the art of video and media production.

Figure 5:
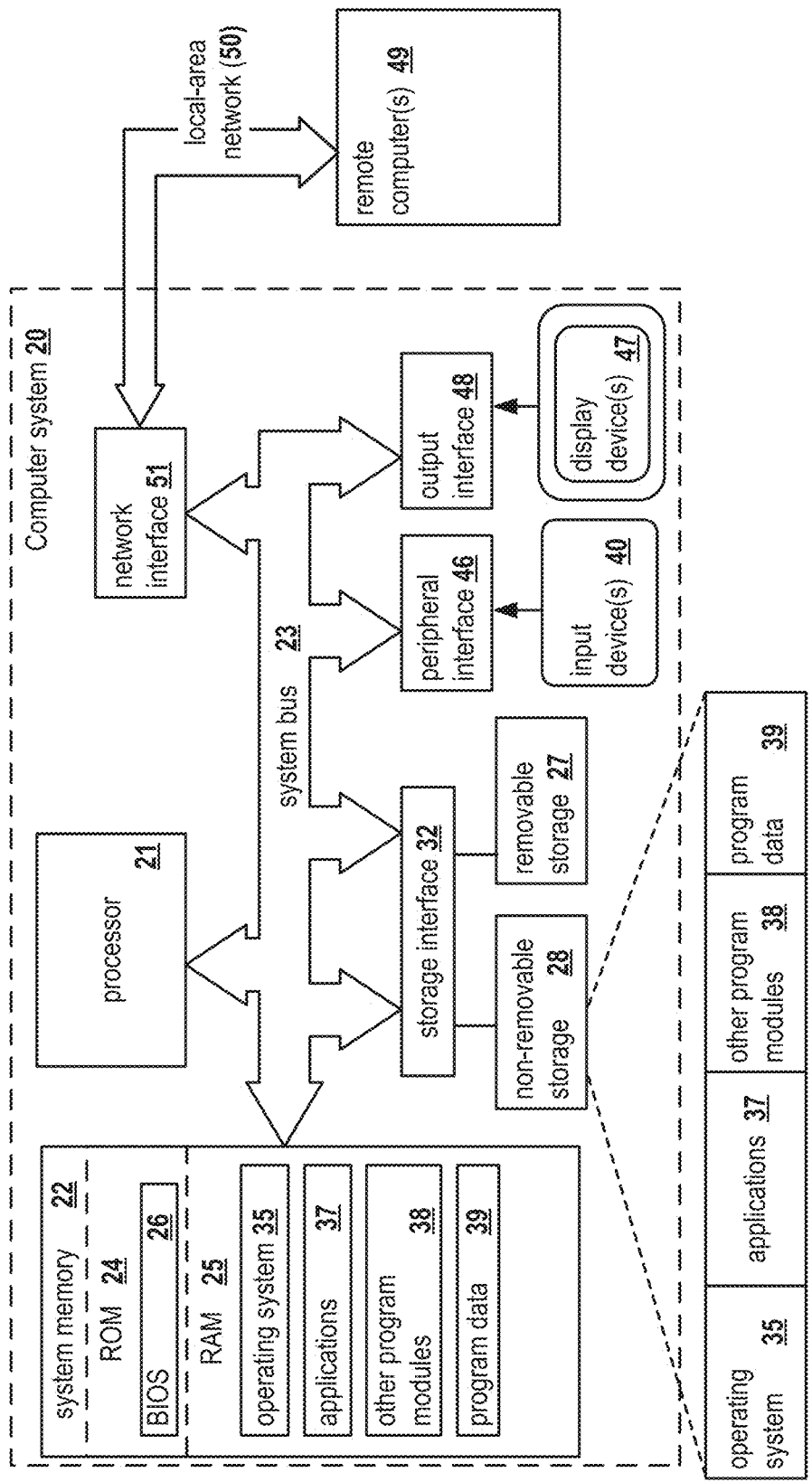
FIG. 5 is a block diagram illustrating a computer system on which aspects of the present systems and methods may be implemented in accordance with an exemplary aspect.

FIG. 5 is a block diagram illustrating a computer system 20 on which exemplary aspects of the system and method for generating a synopsis video of a desired duration can be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20. The storage devices shown in Figure may be configured to store the input video and/or the new video files created for generated synopsis videos.

The system memory 22, removable storage devices 27, and non-removable storage devices 28 of the computer system 20 may be used to store an operating system 35, additional program applications 37, other program modules 38, and program data 39. It is noted that according to one exemplary aspect, the program application 37 can correspond to a web browser of which a filter graph, as described above, can be directly constructed therein. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces. The one or more remote computers may As noted above, exemplary aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system for generating a synopsis video, the system comprising:
   a user interface configured to receive an input video of a first duration;
   a transcription generator configured to generate a timed text transcription of the input video that includes parsed speech that is mapped to different time instances in the input video;
   the user interface further configured to receive a request to generate, based on the input video, a synopsis video with a duration no greater than a second duration that is less than the first duration;
   a sentence identifier configured to divide the timed text transcription into a plurality of sentences, wherein each sentence has a set time duration;
   a ranking module configured to determine a summary of the input video by:
     generating a similarity matrix that compares each of the plurality of sentences;
     ranking each of the plurality of sentences based on the similarity matrix; and
     selecting, as part of the summary, a subset of the plurality of sentences that includes highest ranked sentences of the plurality of sentences, with the subset having a summed time duration that is less than or equal to the second duration; and
   a video editor configured to extract, from the input video, respective clips that correspond to the selected subset of sentences in the summary, and further configured to generate, based on the summary, the synopsis video by combining the extracted clips.

2. The system of claim 1, wherein the transcription generator is further configured to add grammatical identifiers in the parsed speech, wherein the grammatical identifiers include one or more of: a periods, an exclamation point, a question mark, an apostrophe, a quotation mark, a comma.

3. The system of claim 2, wherein the sentence identifier is configured to divide the timed text transcription into the plurality of sentences based on identifying one or more grammatical identifiers that indicate an end of a sentence.

4. The system of claim 1, wherein the sentence identifier is configured to divide the timed text transcription into the plurality of sentences by:
   determining that a first set of words is spoken by a first person and that a second set of words following the first set is spoken by a second person, based on different vocal attributes in an audio portion of the input video;
   classifying the first set of words as at least one sentence; and
   classifying the second set of words as at least one different sentence.

5. The system of claim 1, wherein the sentence identifier is configured to divide the timed text transcription into the plurality of sentences by:
   determining that an audible pause between two portions of the timed text transcription is greater than a threshold period of time; and
   in response to determining that the audible pause is greater than the threshold period of time, determining that a first portion of the two portions is at least one sentence and a second portion of the two portions is at least one different sentence.

6. The system of claim 1, wherein the similarity matrix comprises a plurality of similarity values, wherein a similarity value represents an amount of words shared by two sentences.

7. The system of claim 6, wherein the ranking module is further configured to:
   vectorize each sentence by converting each word of each sentence into a numerical value; and
   determine the similarity value as a cosine similarity between two vectorized sentences.

8. The system of claim 6, wherein the ranking module is further configured to remove stop words in a predetermined dictionary from the timed text transcription.

9. The system of claim 1, wherein the ranking module is further configured to rank each of the plurality of sentences using a pagerank algorithm.

10. The system of claim 1, wherein the video editor is configured to:
    re-sort the subset of the plurality of sentences based on time positions of each sentence in the input video; and
    combine the extracted clips subsequent to re-sorting.

11. The system of claim 1, wherein the video editor is configured to combine the extracted clips in an order of rank of each sentence.

12. A method for generating a synopsis video, the method comprising:

receiving an input video of a first duration;

generating a timed text transcription of the input video that includes parsed speech that is mapped to different time instances in the input video;

receiving a request to generate, based on the input video, a synopsis video with a duration no greater than a second duration that is less than the first duration;

dividing the timed text transcription into a plurality of sentences, wherein each sentence has a set time duration;

determining a summary of the input video by:
generating a similarity matrix that compares each of the plurality of sentences;
ranking each of the plurality of sentences based on the similarity matrix; and
selecting, as part of the summary, a subset of the plurality of sentences that includes highest ranked sentences of the plurality of sentences, with the subset having a summed time duration that is less than or equal to the second duration;

extracting, from the input video, respective clips that correspond to the selected subset of sentences in the summary; and generating, based on the summary, the synopsis video by combining the extracted clips.

13. The method of claim 12, further comprising adding grammatical identifiers in the parsed speech, wherein the grammatical identifiers include one or more of: a periods, an exclamation point, a question mark, an apostrophe, a quotation mark, a comma.

14. The method of claim 13, wherein dividing the timed text transcription into the plurality of sentences is based on identifying one or more grammatical identifiers that indicate an end of a sentence.

15. The method of claim 12, wherein dividing the timed text transcription into the plurality of sentences comprises:
determining that a first set of words is spoken by a first person and that a second set of words following the first set is spoken by a second person, based on different vocal attributes in an audio portion of the input video;
classifying the first set of words as at least one sentence; and
classifying the second set of words as at least one different sentence.

16. The method of claim 12, wherein dividing the timed text transcription into the plurality of sentences comprises:
determining that an audible pause between two portions of the timed text transcription is greater than a threshold period of time; and
in response to determining that the audible pause is greater than the threshold period of time, determining that a first portion of the two portions is at least one sentence and a second portion of the two portions is at least one different sentence.

17. The method of claim 12, wherein the similarity matrix comprises a plurality of similarity values, wherein a similarity value represents an amount of words shared by two sentences.

18. The method of claim 17, further comprising:
vectorizing each sentence by converting each word of each sentence into a numerical value; and
determining the similarity value as a cosine similarity between two vectorized sentences.

19. The method of claim 12, further comprising:
re-sorting the subset of the plurality of sentences based on time positions of each sentence in the input video; and
combining the extracted clips subsequent to re-sorting.

20. The method of claim 12, further comprising combining the extracted clips in an order of rank of each sentence.

* * * * *